United States Patent [19]

Lance et al.

[11] 4,399,905
[45] Aug. 23, 1983

[54] APPARATUS FOR ALTERNATELY FORMING AND FORWARDING STACKS OF ARTICLES

[75] Inventors: William A. Lance, Cincinnati; Alfred H. Abbott, Franklin, both of Ohio

[73] Assignee: The Procter & Gamble Company, Cincinnati, Ohio

[21] Appl. No.: 279,912

[22] Filed: Jul. 2, 1981

[51] Int. Cl.³ ............................................. B65G 47/26
[52] U.S. Cl. .................................. 198/422; 198/430; 271/204; 271/DIG. 10
[58] Field of Search ....................... 198/422, 430, 795; 414/46, 77, 78; 271/DIG. 10, 218, 204

[56] References Cited

U.S. PATENT DOCUMENTS

| | | | |
|---|---|---|---|
| 2,933,176 | 4/1960 | Mansson | 198/812 X |
| 4,056,919 | 11/1977 | Hirsch | 53/540 X |
| 4,142,626 | 3/1979 | Bradley | 198/799 X |
| 4,325,475 | 4/1982 | Spalding | 198/422 X |

Primary Examiner—Jeffrey V. Nase
Assistant Examiner—Paul A. Sobel
Attorney, Agent, or Firm—Thomas J. Slone; Frederick H. Braun; Richard C. Witte

[57] ABSTRACT

An improved apparatus for alternately forming a predetermined stack of articles such as disposable diapers in vertically spaced ways, and then forwarding the stack as a unit from between the ways to ancillary downstream apparatus: for instance, packaging apparatus. The apparatus comprises an endless flight of nestable ways which flight is preferably continuously driven through an infeed station, and which flight has cyclical spatial dwell-and-go motion at an outfeed station. Each stack of articles is removed from between the ways at the outfeed station during such a spatial dwell of the portion of the flight of ways then disposed at the outfeed station.

4 Claims, 13 Drawing Figures

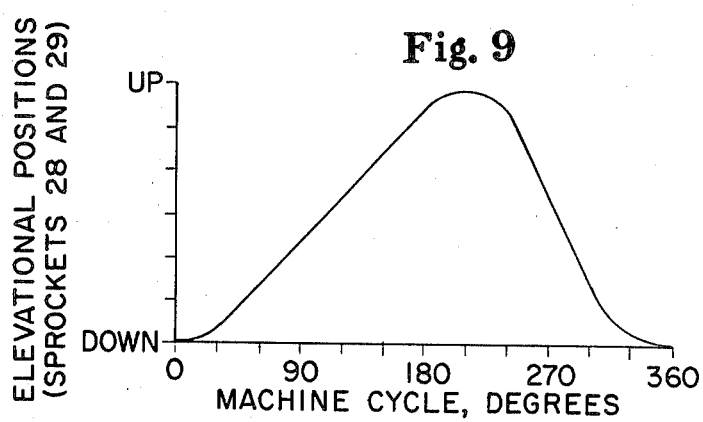
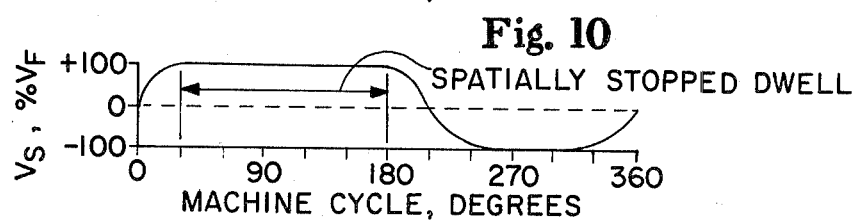
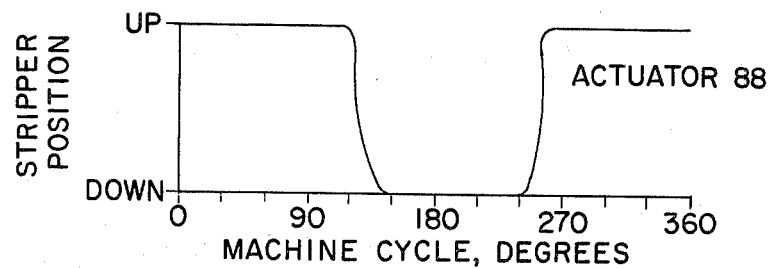
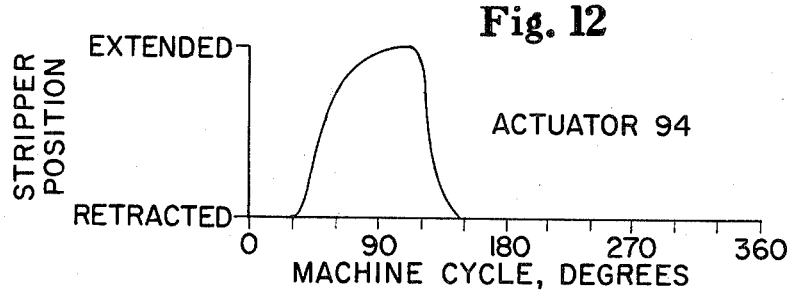

APPARATUS FOR ALTERNATELY FORMING AND FORWARDING STACKS OF ARTICLES

DESCRIPTION

1. Technical Field

This invention pertains to an improved apparatus for alternately forming a stack of articles between vertically spaced ways, and then forwarding the stack as a unit from between the ways. More specifically, it pertains to providing such an apparatus wherein an endless flight of nestable ways is continuously driven through an infeed station, yet has cyclical dwell-and-go motion at an outfeed station. The dwells permit a reciprocable stripper to periodically strip a formed stack of articles from between the ways as a unit while the associated ways are spatially arrested.

2. Background Art

Prior flighted apparatuses for alternately forming and forwarding stacks of articles from between vertically spaced ways include those in which the entire flight of ways is periodically arrested while a formed stack of articles is removed; and constant motion flights from which formed stacks are stripped on-the-fly. That is, from which stacks of articles are removed while the flight of ways remains in continuous motion.

U.S. Pat. Nos. 1,659,831 and 1,803,123 which issued to G. W. Mudd, and U.S. Pat. No. 3,954,165 which issued to Clarence A. Snyder disclose intermittent motion apparatuses; and U.S. Pat. No. 2,324,930 which issued to G. G. Joa and U.S. Pat. No. 4,056,919 which issued to John L. Hirsch disclose strip-on-the-fly apparatuses. As compared to the background art apparatuses, the present invention provides the benefits of continuous infeed without incurring the problems of stripping-on-the-fly.

DISCLOSURE OF THE INVENTION

In accordance with one aspect of the invention, an improved apparatus is provided for alternately forming a predetermined stack of articles in vertically spaced ways, and then removing the stack as a unit from between the ways. The improved apparatus includes an endless flight of ways which flight is looped about a plurality of guide members to define a closed path, and which path passes through an infeed station and an outfeed station. The improved apparatus also includes stack removal means, drive means, and means for operating the flight in timed relation with an article infeed means so that, preferably, one article is received between each two adjacent ways at the infeed station. The improvement in the apparatus comprises means for cyclically spatially stopping and forwarding a portion of the flight disposed at the outfeed station while continuously forwarding the flight through the infeed station, and means for operating the stack removal means in such timed relation that each time a stack of articles arrives at the outfeed station it is forwarded from between the ways as a unit to an ancillary receiving means while the stack has been spatially stopped. The means for cyclically spatially stopping and forwarding a portion of the flight of ways may comprise means for cyclically reciprocating some of the guides so that during a predetermined segment of each cycle, the velocity of the reciprocating means nullifies the driven linear velocity of the flight. The ways of the improved apparatus may be nestable in such a manner that bridging portions of the ways interact with finger portions to define a continuous array of closed bottom U-shape article receiving spaces.

BRIEF DESCRIPTIONS OF THE DRAWINGS

While the specification concludes with claims particularly pointing out and distinctly claiming the subject matter regarded as forming the present invention, it is believed the invention will be better understood from the following description taken in conjunction with the accompanying drawings in which:

Figure 2:
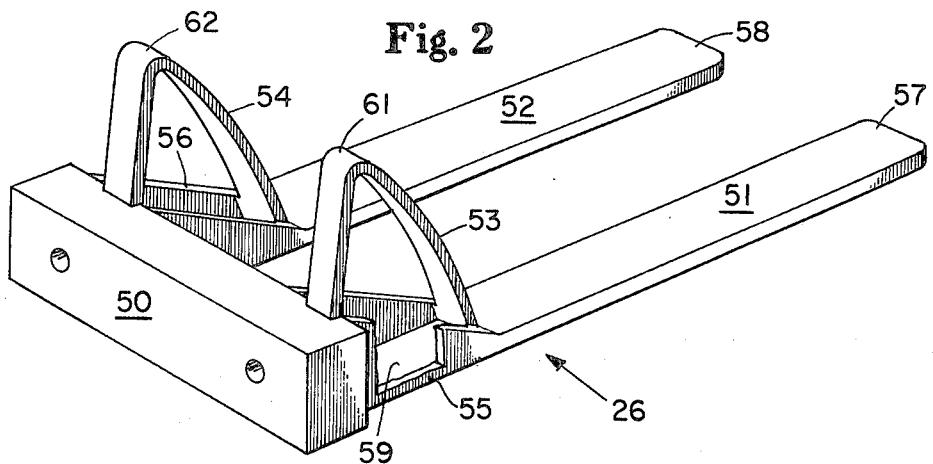
FIG. 2 is an enlarged scale perspective view of a nestable way.
Figure 3:
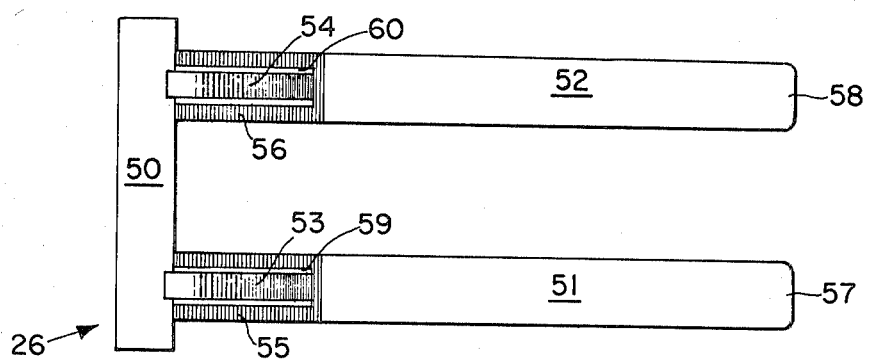
Figure 4:
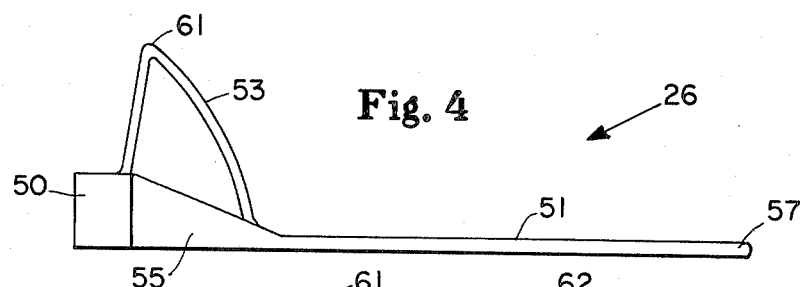
Figure 5:
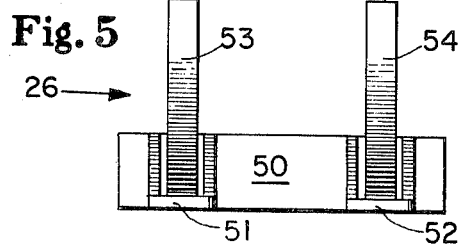

FIGS. 3-5, inclusive, are top, side, and frontal views respectively of the nestable way shown in FIG. 2.

Figure 1:
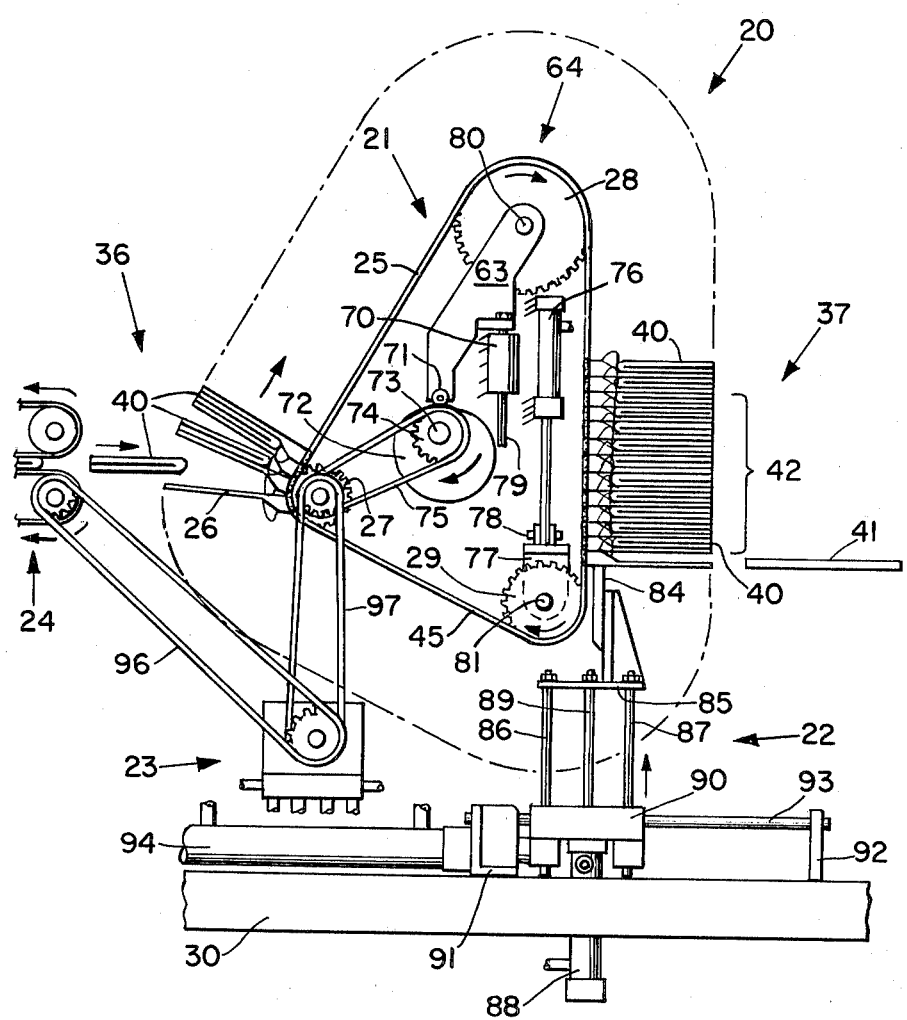
FIG. 1 is a partially schematic, fragmentary side elevational view of a stack forming and forwarding apparatus embodying the present invention at a time in its cycle just before a formed stack of articles is to be stripped from between its ways at its outfeed station.
Figure 6:
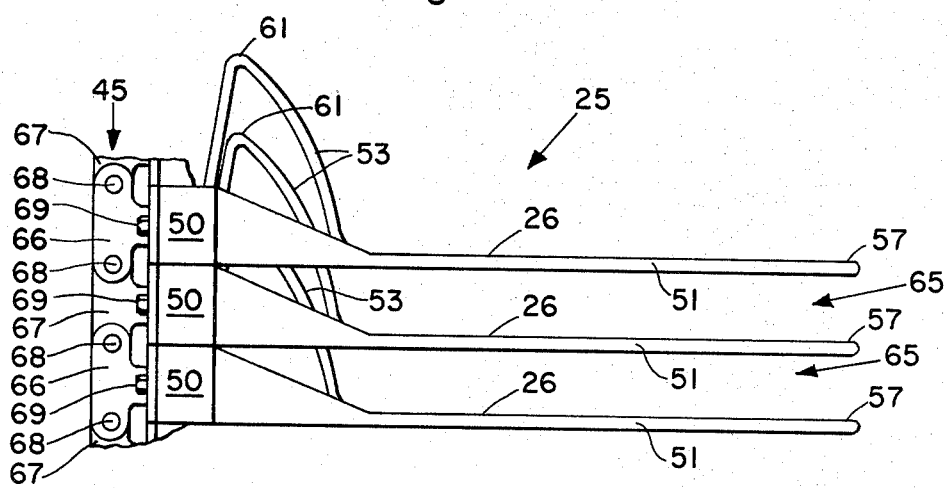

FIG. 6 is an enlarged scale, fragmentary side elevational view of the flight of ways of the apparatus shown in FIG. 1.

Figure 7:
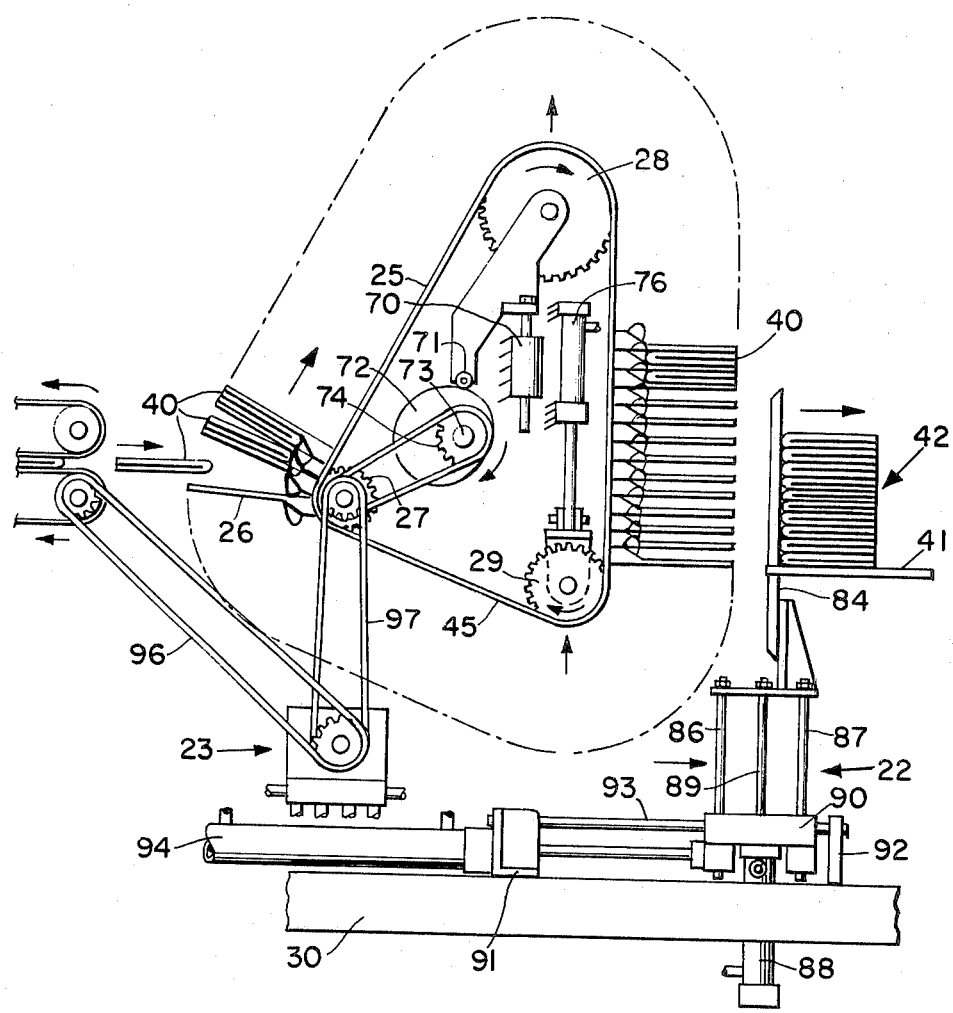

FIG. 7 is a partially schematic fragmentary side elevational view of the apparatus of FIG. 1 at a later point in its cycle just after a stack of articles has been forwarded from between the ways to an ancillary receiving platform.

Figure 8:
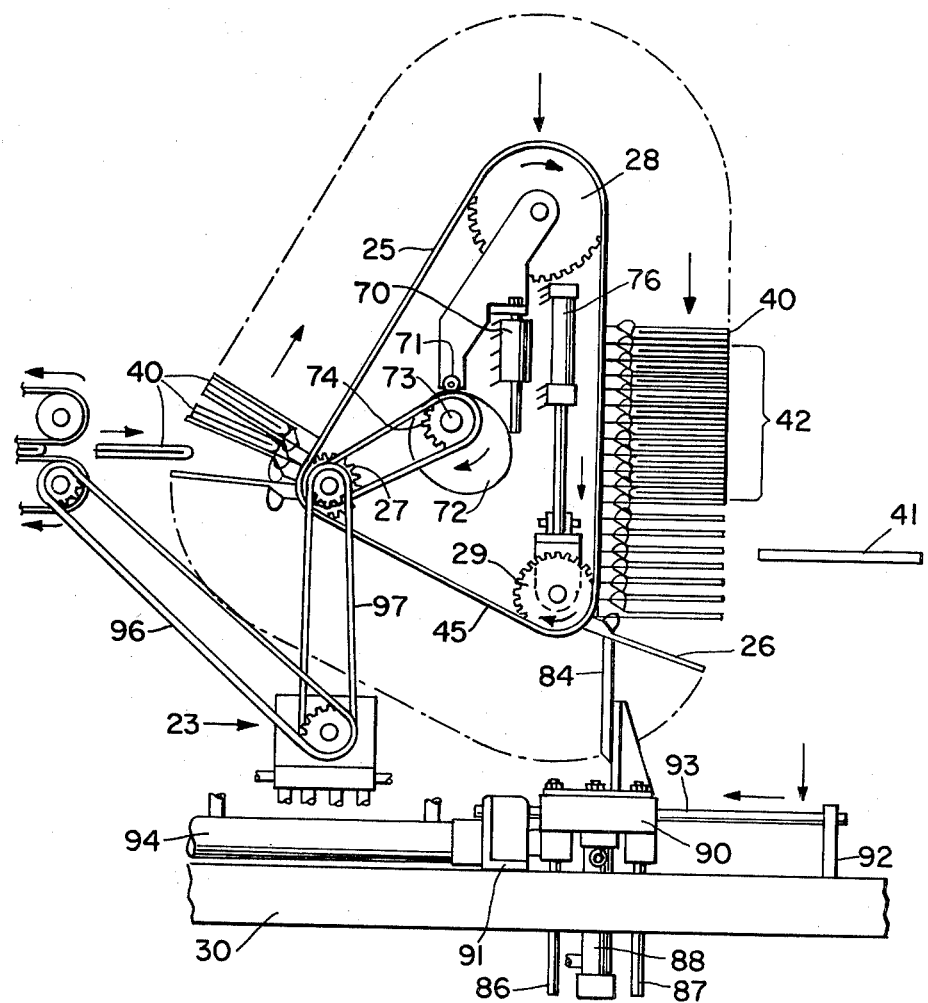

FIG. 8 is another partially schematic fragmentary side elevational view of the apparatus of FIG. 7 at a still later point in its cycle when another stack of articles is advancing downward to the outfeed station.

FIG. 9 is a graph showing the relation between the elevation of the cam lifted guides of the apparatus of FIG. 1 with respect to the rotational position of the lift cam in machine degrees; each revolution of the cam being a three-hundred-sixty-degree machine cycle of the apparatus.

FIG. 10 is a graph showing the relation between the spatial velocity of the portion of the flight of ways which is disposed at the outfeed station of the apparatus of FIG. 1 with respect to the rotational position of the lift cam.

FIGS. 11 and 12 are graphs showing the EXTEND-RETRACT, and UP-DOWN relations of the stack stripper of the apparatus of FIG. 1 with respect to the machine cycle of the apparatus.

Figure 13:
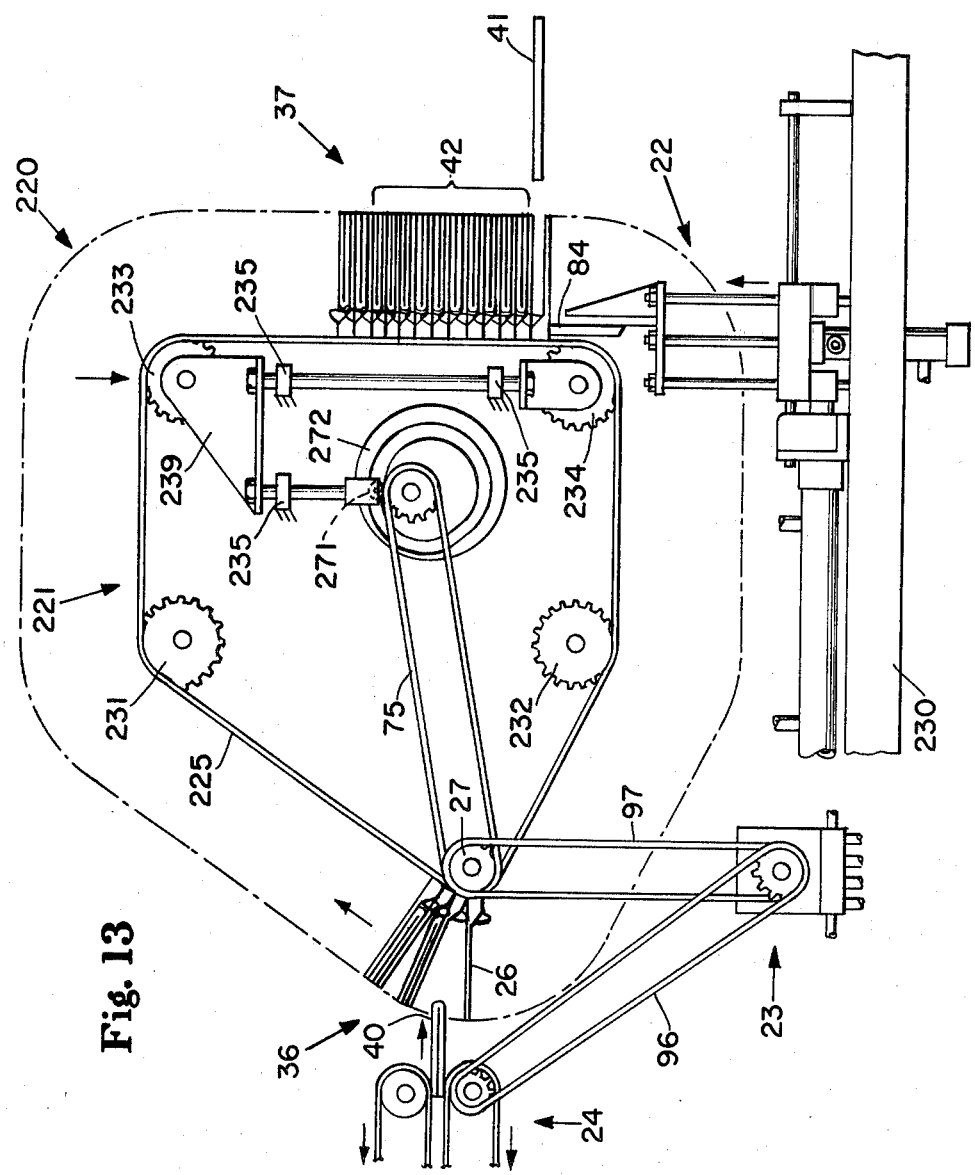

FIG. 13 is a partially schematic, fragmentary side elevational view of an alternate apparatus embodiment of the present invention.

DETAILED DESCRIPTION OF THE INVENTION

An exemplary stack forming and forwarding apparatus 20 embodying the present invention is shown in FIG. 1. Apparatus 20 includes a stacker 21, a stripper 22, and drive-control means 23 for operating the stacker 21 in timed relation with ancillary infeed means 24 and stripper 22 for the purpose of converting a serial stream of articles 40 into predetermined stacks 42 of articles 40. These elements are attached to a suitable frame 30 of which only a fragmentary portion is shown in FIG. 1.

Briefly, the stacker 21 of the exemplary apparatus 20, FIG. 1, comprises an endless flight 25 of ways 26 which flight passes through portions of the apparatus generally designated infeed station 36 and outfeed station 37. In operation, the flight of ways is continuously driven through the infeed station 36 and, preferably, one article 40 is received intermediate each pair of adjacent ways 26 while the ways are in divergent relation. Then, as the flight of ways moves clockwise, the articles become vertically stacked between the vertically spaced ways extending downwardly through the outfeed station 37. As the lowermost article 40 of the vertically stacked articles nears the elevation of the ancillary receiving platform 41, the portion of the flight of ways adjacent the receiving platform 41 is spatially arrested for a predetermined dwell segment of the machine cycle (of apparatus 20 by raising the sprockets 28 and 29 about which the flight is looped) at a velocity $V_S$ which is equal in magnitude and opposite in direction to the linear velocity $V_F$ of the flight of ways paying over those sprockets. Then, the stripper 22 is actuated to its Extended position to strip a predetermined stack 42 of articles from between the vertically spaced ways while the stack 42 is spatially stopped: i.e., arrested. The stripper 22 is then reset, and the sprockets 28 and 29 which have been raised are then lowered to prepare for the next stack stripping event. Thus, apparatus 20 is of the continuous motion type but has cyclical spatial dwell-and-go motion at its outfeed station to obviate the need for stripping-on-the-fly.

Referring again to FIG. 1, the flight 25 of ways 26 comprises an endless chain 45 which is looped about sprockets 27, 28, and 29, and a corresponding second chain and set of sprockets not visible in FIG. 1 by virtue of being transversely spaced from the plane of chain 45 and sprockets 27, 28, and 29. Thus, the proximal end of each way 26 extends transversely between the two chains and is secured to each chain to extend generally perpendicularly outwardly therefrom. A two-chain stacking apparatus of this general geometry (i.e., two transversely spaced chains) is disclosed in the hereinbefore referenced U.S. Pat. No. 2,324,930 which is hereby incorporated by reference. Accordingly, the operation of the stacker 21 is described by referring to sprockets 27, 28 and 29 with the intent that it be understood to mean those sprockets and their transversely spaced counterparts not shown in FIG. 1.

A preferred embodiment of a way 26 is shown in FIGS. 2 through 5 to comprise a proximal end block 50, two transversely spaced tynes 51 and 52, and two arcuate-shape bridging portions 53 and 54. The tynes 51 and 52 are cantilevered from the end portions of block 50, and are alternatively referred to herein as finger portions of way 26. The proximal end portions of tynes 51 and 52 are designated 55 and 56, respectively, and their distal end portions are designated 57 and 58, respectively. Also, the proximal end portions 55 and 56 of tynes 51 and 52 are provided with slots 59 and 60, respectively, which are configured and disposed to receive the distal end portions 61 and 62 of the bridging portions 53 and 54, respectively, of an adjacent way 26. Thus, adjacent ways 26 are in partially nested relation with each other when incorporated in the flight 25 of ways 26 as shown in FIG. 1.

FIG. 6 is an enlarged scale, fragmentary side elevational view of flight 25 which shows three ways 26 in their partially nested relation. Thus, as seen in FIG. 6, a variable geometry U-shape article receiver 65 is formed between each two adjacent ways 26 of flight 25: the sides of the U being the tynes 51 of both ways; and the bottom of the U being the bridging portions 53 of the ways. The partial nesting enables the U-shape article receivers 65 to have variable geometry yet remain closed bottomed as their sides alternately change from being in parallel relation to being in divergent relation as the flight 25 passes over arcuate portions of the sprockets 27, 28, and 29, FIG. 1. By remaining closed bottomed, the U-shape article receivers 65 provide continuous supports for the nose portions of articles 40 as the articles are conveyed upwardly from the infeed station 36 and pass over sprocket 28, FIG. 1.

FIG. 6 also shows that chain 45, FIG. 1, comprises links 66 and 67 which are hingedly connected together by pins 68; and shows the ways 26 to be secured to links 66 and 67 by bolts 69.

Referring again to FIG. 1, stacker 21 is alternatively referred to as a stack forming means. It further comprises means 64 for cyclically raising and lowering sprockets 28 and 29 between their respective UP and DOWN positions. Means 64 comprises upper yoke 63, guide pin 79, guide bushing 70, cam follower 71, cam 72 rotatably mounted on shaft 73, sprocket 74 keyed to shaft 73 to rotate with cam 72, chain 75 connecting sprockets 27 and 74, penumatic actuator 76, lower yoke 77, and clevis pin 78. Additionally, sprocket 28 is freely rotatably mounted in yoke 63 on shaft 80; and sprocket 29 is freely rotatably mounted in yoke 77 on shaft 81.

Still referring to FIG. 1, guide bushing 70 is secured to frame 30 so that guide pin 79 is freely vertically movable therein. Guide pin 79 is rigidly secured to a flange on yoke 63 so that the yoke 63 is restricted to vertical motion. Cam follower 71 is rotatably secured to yoke 63 so that it is operatively associated with cam 72. Thus, yoke 63 will carry sprocket 28 to its UP position as the cam 72 is rotated, and sprocket 28 is returned to its DOWN position by gravity and by chain tension induced by actuator 76 as described below. Alternatively, of course, sprocket 28 could be positively moved upwards and downwards by cam 72 if it were a track-type cam.

Continuing to refer to FIG. 1, actuator 76 biases yoke 77 downwardly to induce sufficient tension in chain 45 to obviate slack in chain 45. To do this, actuator 76 is supplied by compressed air at a regulated pressure by an adjustable air controller portion of drive-control means 23.

Stripper 22, FIG. 1, which has hereinbefore been alternatively designated the stack removal means comprises a pusher 84, a yoke 85, two vertical guides 86 and 87, raise-lower actuator 88 having actuator rod 89, carriage assembly 90, brackets 91 and 92 secured to frame 30, two horizontal guides 93 (only one of which is visible in FIG. 1) which are secured between brackets 91 and 92, and extend-retract actuator 94 which is cantilevered from bracket 91. Briefly, carriage 90 is slideably mounted on guides 93 and is connected to the actuator rod of actuator 94 by means not shown for powered operation between an EXTEND position and a RETRACT position. Actuator 88 is mounted on carriage 90 and connected to pusher 84 through yoke 85 so that actuator 88 can power the pusher 84 to its UP position when the actuator rod 89 is extended, and to its DOWN position when the actuator rod 89 is retracted. Guides 86 and 87 extend vertically upward from carriage 90 and through yoke 85 so that actuator 88 is limited to moving the pusher vertically. Pusher 84 extends upwardly between the tynes 51 and 52 of the vertically spaced ways 26 disposed at the outfeed station 37. Thus, when actuator 94 is actuated to move carriage 90 to its EXTENDED position, pusher 84 will simultaneously push against the noses of all of the articles constituting stack 42 to cause the stack to be removed as a unit from between the ways 26 and forwarded onto receiving platform 41. Ancillary means not shown—for instance, carton filling apparatus—would then assume control of the stacks of articles.

Drive-control means 23, FIG. 1, of the examplary apparatus 20 is mechanically coupled by chains 96 and 97 to the ancillary infeed means 24 and the stacker 21, respectively, so that the flight 25 of ways 26 of stacker 21 is operated in timed relation with infeed means 24 to preferable receive one article 40 between each two ways 26. Preferably, flight 25 is continuously advanced through the infeed station 36 at a constant albeit adjustable linear velocity. Drive-control means 23 also comprises means such as limit switches (not shown) and air control solenoids (not shown) which are operated in timed relation with the stacker 21 so that each time the bottom of a stack 42 of articles 40 approaches the elevation of receiving platform 41, the pusher 84 is operated through the following sequence: EXTEND, FIG. 7; DOWN-RETRACT, FIG. 8; and UP, to the position shown in FIG. 1. This sequence causes the pusher 84 to forward the stack 42 onto the receiving platform 41, FIG. 7; and then to reset the pusher to its UP-RETRACTED position without interferring with the next stack of articles then being lowered by flight 25.

FIG. 9 is a graph showing the relation between the elevational positions of sprockets 28 and 29 as determined by lift cam 72, and the machine cycle of apparatus 20. That is, as the cam 72 rotates through 360 degrees—one machine cycle—the cam geometry causes the sprockets 28 and 29 to move from DOWN to UP, and controls the rate of their being returned to DOWN by gravity and actuator 76. Thus, the vertical axis in FIG. 9 is calibrated in translational displacement of sprockets 28 and 29 from DOWN to UP. This translational displacement is, in the exemplary embodiment apparatus 20, linear from about thirty (30) to about one-hundred-eighty (180) degrees, and from about two-hundred-fifty (250) to about three-hundred-ten (310) degrees. These linear cam displacement sectors of the machine cycle causes the sprockets translational displacement velocity $V_S$, FIG. 10, to be constant as the cam rotates through those sectors. As also indicated in FIG. 10, the cam 72 is so contoured that the constant upward translational velocity $V_S$ of sprockets 28 and 29 during the machine cycle sector of from about thirty (30) to about one-hundred-eighty (180) degrees is equal in magnitude but opposite in direction to the velocity $V_F$ of the flight 25 of ways 26 paying downwardly over sprocket 28 and through the outfeed station 37, FIG. 1. Therefore, the spatial velocity of the flight 25 is zero for that sector of the machine cycle. This provides a sufficient spatial dwell for the portion of flight 25 extending through the outfeed station so that a stack of articles can be stripped therefrom without being stripped-on-the-fly. That is, stripped during the spatial dwell.

FIGS. 11 and 12 are graphs which show the operation of the stripper 22, FIG. 1, with respect to the machine cycle. More specifically, FIG. 12 shows that actuator 94 moves the stripper's pusher 84 to the EXTENDED position during the initial portion of the spatially stopped dwell of flight 25, FIG. 10. Then, in the preferred embodiment machine cycle represented in FIGS. 11 and 12 actuators 88 and 94 retract simultaneously causing the stripper to go to its DOWN-RETRACTED position as shown in FIG. 8. Finally, FIG. 11 shows the stripper moving to it UP position, FIG. 1, which completes the resetting of the stripper to its UP-RETRACTED position of FIG. 1 in readyness for the next stack stripping event.

In normal, constant speed operation of apparatus 20, FIG. 1, an article 40 is received between each pair of ways 26 of flight 25 as they pass through the infeed station 36. Thus, at the point in the machine cycle shown in FIG. 1, each of the spaces between adjacent ways of the portion of flight 25 which extends from the infeed station to the outfeed station contains an article 40, and the elevation of the lowermost article in the outfeed station is near the elevation of the receiving platform 41. At this time the cam 72 is at its lowest point and then commences to raise sprockets 28 and 29 as described hereinbefore. The profile of cam 72 causes the sprockets 28 and 29 to rise at a velocity $V_S$ equal in magnitude and opposite in direction to the velocity $V_F$ of the flight 25 paying over sprocket 28. This causes, for a predetermined sector of the machine cycle, the portion of flight 25 which extends through the outfeed station to be spatially arrested; that is, spatially stopped with respect to the receiving platform 41. During this spatially arrested dwell, the pusher 84 is EXTENDED to the position shown in FIG. 7 which forwards stack 42 as a unit from between the vertically spaced ways 26 to the receiving platform 41. The height reduction of stack 42 between FIGS. 1 and 7 is, essentially, the combined thickness of the intervening ways 26. Then, as the sprockets 28 and 29 move downwardly as indicated in FIG. 8, the pusher is reset to its stack removal position (FIG. 1) by sequentially moving to the DOWN-RETRACT, and UP positions as described hereinbefore. As the sprockets 28 and 29 move downwardly, their velocity is added to the forwarding velocity of flight 25 to rapidly move the next succeeding stack 42, FIG. 8, into the outfeed station; i.e., the position at which the stack will first be spatially arrested and then pushed onto the receiving platform 41.

As described above, apparatus 20 comprises means for having a continuous infeed, and periodic stack removal while the stack is spatially stopped but while the overall mechanism continuous to operate. Thus, apparatus 20 is of the continuous motion type but obviates the need for stripping-on-the-fly.

ALTERNATE EMBODIMENT

An alternate apparatus 220 embodying the present invention is shown in FIG. 13 to be substantially like apparatus 20, FIG. 1 except for comprising an alternate stripper 221 in place of stripper 21. Essentially, stripper 221 comprises a flight 225 of ways 26 looped about sprockets 27, 231, 232, 233 and 234; and camming means for positively displacing sprockets 233 and 234 upwardly and downwardly between their respective UP and DOWN positions. Otherwise, the apparatus is constructed and operated like apparatus 20 as described hereinbefore. Accordingly, the description thereof will not be repeated except to say that it provides continuous infeed with intermittent outfeed, and is of the continuously driven type yet obviates stack stripping-on-the-fly.

Briefly, whereas the geometry of the apparatus 20, FIG. 1, necessitates means for compensating for sprockets 28 and 29 having unequal displacements during their UP and DOWN excursions, alternate apparatus 200, FIG. 13, embodying the present invention requires no such means. That is, whereas apparatus 20 comprises constant tension actuator 76 for maintaining constant tension in flight 225, the geometry of apparatus 200 obviates the need for such a constant tension means. In apparatus 200, FIG. 13, sprockets 231, 232, 233 and 234 are of equal size and are disposed at the four corners of an immaginary parallelogram. Sprockets 231 and 232 are rotatably secured to the frame 230 on fixed centers; and sprockets 233 and 234 are yoked together by Yoke 239 and vertically slideably mounted on frame 230 through three bushings 235. Cam 272 is a track type cam having a follower 271 disposed in the track of the cam so that the cam—as it rotates—positively displaces sprockets 233 and 234 vertically between their UP and DOWN positions.

While particular embodiments of the present invention have been illustrated and described, it would be obvious to those skilled in the art that various other changes and modifications can be made without departing from the spirit and scope of the invention. It is intended to cover in the appended claims all such changes and modifications that are within the scope of this invention.

What is claimed is:

1. An improved apparatus for alternately forming a predetermined stack of articles in vertically spaced ways, and then removing the stack as a unit from between said ways, said apparatus including a frame, an endless flight of said ways looped about a plurality of guide members to define a closed path which path passes through an infeed station and an outfeed station, stack removal means, unitary flight drive means, and means for operating said flight drive means in timed relation with an ancillary article infeed means so that a said article is received between each two adjacent said ways at said infeed station, said improvement comprising means for cyclically spatially stopping and forwarding a portion of said flight of ways adjacent said outfeed station while continuously operating said unitary flight drive means to continuously forward said flight of ways through said infeed station and past all of said guide members, and means for operating said stack removal means in timed relation with said cyclically stopping so that each time a said stack of articles arrives at said outfeed station, said stack is forwarded from said ways to an ancillary receiving means while said stack has been spatially stopped.

2. The improved apparatus of claim 1 wherein said means for cyclically spatially stopping and forwarding a portion of said flight of ways comprises means for cylically reciprocating adjacent said reciprocable guides between which adjacent reciprocable guides said portion of said flight of ways extends so that during a predetermined dwell segment of each cycle of reciprocation the velocity of displacing said adjacent guides is sufficient in magnitude and opposite in direction to the linear velocity of advancing said portion of said flight of ways between said adjacent guides that said portion of said flight of ways is spatially stopped for said predetermined dwell segment of each cycle of reciprocation.

3. The improved apparatus of claim 2 wherein said guides which are cyclically reciprocated are simultaneously raised by a positive displacement mechanical means and lowered by means for biasing said flight of ways to maintain a substantially constant level of tension in said flight of ways to accommodate reciprocation induced guide-to-guide spacing changes.

4. The improved apparatus of claim 2 wherein said guides comprise two side-by-side fixed position guides and two side-by-side reciprocable guides, and said apparatus further comprises an articulated parallelogram linkage with said guides disposed at the four corners of said parallelogram linkage so that said guides and said parallelogram linkage corporately constitute means for maintaining constant guide-to-guide spacing about said closed path as the two reciprocable guides are cyclically reciprocated in unison by said means for cyclically reciprocating adjacent said reciprocable guides.

* * * * *